(12) United States Patent
Sakagami et al.

(10) Patent No.: US 8,483,921 B2
(45) Date of Patent: Jul. 9, 2013

(54) TWO/FOUR-WHEEL DRIVE MODE SHIFT CONTROLLER FOR TRACTION-TRANSMITTING PART TIME FOUR-WHEEL DRIVE VEHICLE AND METHOD FOR CONTROLLING THE SAME

(75) Inventors: Eigo Sakagami, Kawasaki (JP); Atsuhiro Mori, Fujisawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 45 days.

(21) Appl. No.: 13/375,634

(22) PCT Filed: Apr. 21, 2010

(86) PCT No.: PCT/JP2010/057069
§ 371 (c)(1),
(2), (4) Date: Dec. 1, 2011

(87) PCT Pub. No.: WO2010/140433
PCT Pub. Date: Dec. 9, 2010

(65) Prior Publication Data
US 2012/0089310 A1  Apr. 12, 2012

(30) Foreign Application Priority Data

Jun. 3, 2009  (JP) .................................. 2009-134081

(51) Int. Cl.
*G06F 7/00* (2006.01)
(52) U.S. Cl.
USPC ................. 701/69; 701/89; 180/247; 475/165
(58) Field of Classification Search
USPC ............... 476/61, 67; 475/165, 295; 180/247, 180/248, 249, 233, 197
See application file for complete search history.

(56) References Cited

U.S. PATENT DOCUMENTS

| 4,792,012 A | * | 12/1988 | Morisawa et al. | ............ 180/247 |
| 5,041,978 A | * | 8/1991 | Nakayama et al. | ............. 701/84 |
| 5,170,343 A | * | 12/1992 | Matsuda | ......................... 700/79 |

(Continued)

FOREIGN PATENT DOCUMENTS

| JP | 60-219124 A | 11/1985 |
| JP | 63-176730 A | 7/1988 |
| JP | 1-148627 A | 6/1989 |
| JP | 9-119506 A | 5/1997 |
| JP | 10-272949 A | 10/1998 |
| JP | 2009-173261 A | 8/2009 |
| WO | WO 2011/001743 A1 | 1/2011 |

OTHER PUBLICATIONS

U.S. Appl. No. 13/379,973, filed Dec. 21, 2011, Sakagami et al.

*Primary Examiner* — Thomas Black
*Assistant Examiner* — Shardul Patel
(74) *Attorney, Agent, or Firm* — Foley & Lardner LLP

(57) ABSTRACT

[Problem] A two-wheel→four-wheel drive switching for a traction-transmitting part time four-wheel drive vehicle in which a gear clutch for separating one of auxiliary driving wheels from a drive train is equipped can be carried out under a shock reduction.
[Means for solving problem] In a case where a two-wheel→four-wheel drive switching request occurs during a traveling of the vehicle (step S11 and step S12), an operation of switching a traction-transmitting transfer from a non-transmitting state to a transmitting state is preceded (step S18 and step S22) and, thereafter, the gear clutch is engaged (step S21 and step S22) when a revolution speed difference $\Delta Vw$ between main and auxiliary driving wheels is $0 < \Delta Vw < \alpha$ along with an advance of the state switching of the transfer so that large shock and abnormal sound are not generated even if the gear clutch is switched from a released state to an engagement state.

8 Claims, 6 Drawing Sheets

U.S. PATENT DOCUMENTS

| | | | |
|---|---|---|---|
| 5,819,194 A * | 10/1998 | Hara et al. | 701/89 |
| 6,062,330 A * | 5/2000 | Watson et al. | 180/248 |
| 6,898,504 B2 * | 5/2005 | Kadota | 701/67 |
| 2005/0121249 A1 * | 6/2005 | Iwaki et al. | 180/252 |
| 2010/0276246 A1 | 11/2010 | Mori et al. | |

* cited by examiner

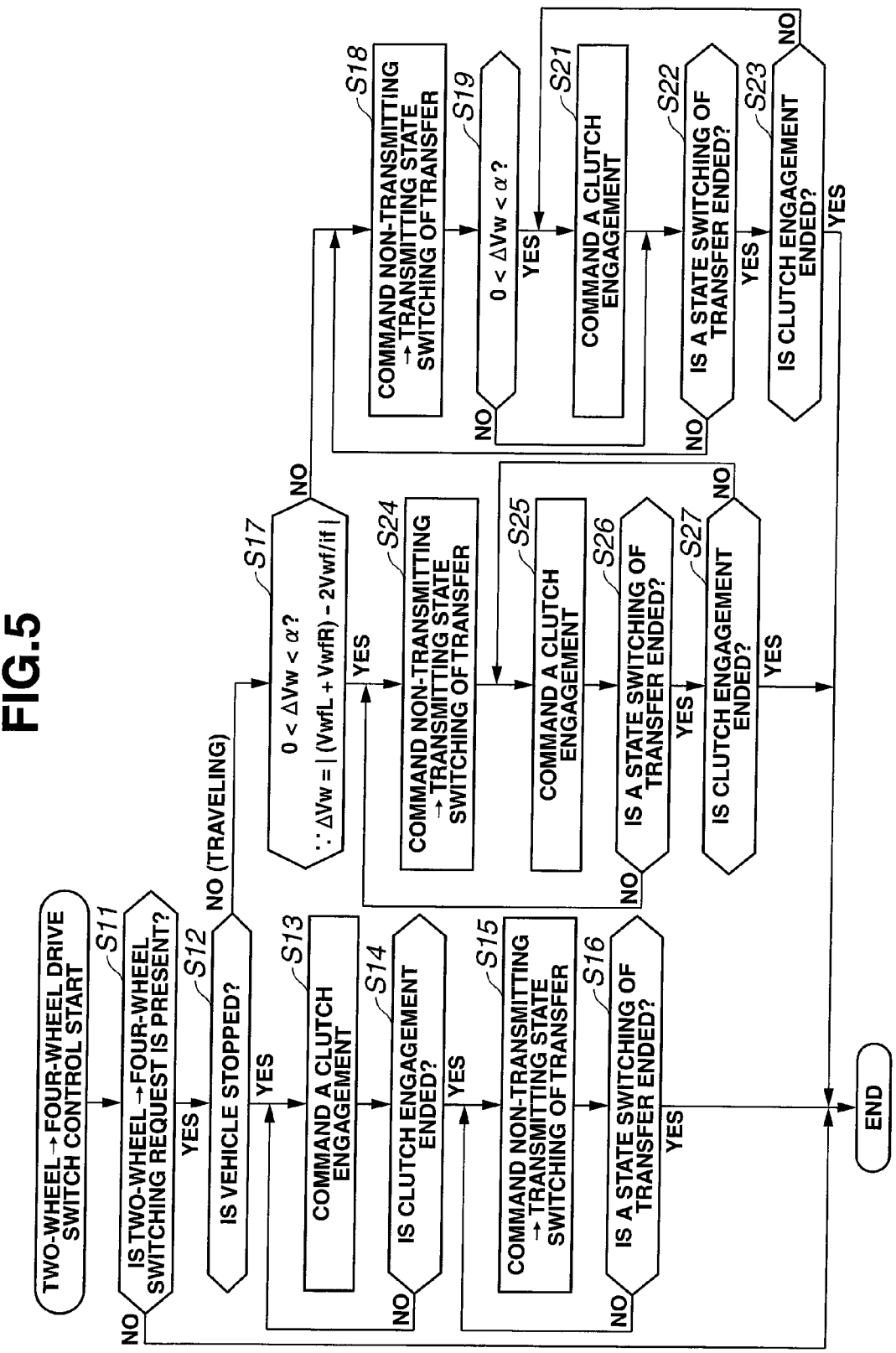

TWO/FOUR-WHEEL DRIVE MODE SHIFT CONTROLLER FOR TRACTION-TRANSMITTING PART TIME FOUR-WHEEL DRIVE VEHICLE AND METHOD FOR CONTROLLING THE SAME

TECHNICAL FIELD

The present invention relates to a traction transmitting part time four wheel drive vehicle which is equipped with a traction-transmitting transfer through which part of a torque toward main driving wheels can appropriately be directed to left and right auxiliary driving wheels and a gear clutch which is provided with at least one of the left and right auxiliary driving wheels in a non-transmitting state of the transfer is separated from an auxiliary driving wheel drive train and, particularly, relates to two/four-wheel drive switching control apparatus and method for the traction-transmitting part time four wheel drive vehicle which perform a two-wheel→four-wheel drive switching from a two-wheel drive of the vehicle to a four-wheel drive thereof under a shock reduction.

BACKGROUND ART

A part time four-wheel drive vehicle falls in a four-wheel drive state when a transfer, which is a two-wheel/four-wheel drive switching mechanism, is directed to a transmitting state in order for part of a torque to main driving wheels to be directed to auxiliary driving wheels and in a two-wheel drive state only by means of the main driving wheels when the transfer is directed to a non-transmitting state in order for the torque not to be directed to the auxiliary driving wheels and can perform a two-wheel/four-wheel drive switching between the two-wheel drive and the four-wheel drive according to a state switching between the non-transmitting state and the transmitting state.

Incidentally, during the two-wheel drive in which the transfer is in the non-transmitting state, a transmitting system of the auxiliary driving wheels, which are not presently driven, namely, a power transmission system of the transfer and between the auxiliary driving wheels is in a reverse drive state in which the torque is transmitted from the auxiliary driving wheel side to the transfer side (accurately speaking, an auxiliary driving train is revolved from a tire side (the auxiliary driving wheel side) as opposed to a positive drive state during the four-wheel drive (a state in which the torque is transmitted from the transfer side to the auxiliary driving wheel side). Therefore, a large influence of a revolving force from the auxiliary driving wheel side is given.

A driving resistance generated according to this reverse drive gives more or less an influence on a vehicular vibration, noise, and a fuel consumption. Hence, its countermeasure is needed. That is to say, the auxiliary driving train is revolved from the tire side so that an ill influence of loss and so forth is given. Hence, its countermeasure becomes necessary.

In other words, an auxiliary driving wheel side drive shaft, an auxiliary driving wheel side differential, an auxiliary driving wheel side propeller shaft, and an auxiliary driving wheel side clutch element of the transfer (hereinafter, omitted as rotary bodies for simplicity) are mechanically coupled with the auxiliary driving wheels. These rotary bodies are revolved together with one another along with the revolution of auxiliary driving wheels during the two-wheel drive. In addition, during the two-wheel drive, these rotary bodies are revolved in spite of the fact that these rotary bodies are not needed to be revolved. The revolution of these rotary bodies causes a friction resistance in bearings or gears and a rotary inertia to be a driving loss.

To cope with this countermeasure, a two/four-wheel drive switching control apparatus for the part time four-wheel drive vehicle has been proposed for a part time four-wheel drive vehicle, for example, as described in Patent Document 1.

The two/four-wheel drive switching control apparatus for the part time four-wheel drive vehicle described in Patent Document 1 separates one of the left and right auxiliary driving wheels from the auxiliary driving wheel drive train at a time of the two wheel drive from the auxiliary driving wheel drive train so that the separated auxiliary driving wheel is in a free state. Thus, the drive resistance along with the above-described reverse drive is reduced as low as possible and the ill influence on the vehicular vibration, noise, fuel consumption, and so forth is eliminated as remarkably as possible.

PRE-PUBLISHED DOCUMENT

Patent Document 1: A Japanese Patent Application First Publication (Tokkai) No. Showa 60-219124 (FIG. 2).

DISCLOSURE OF THE INVENTION

Problem to be Solved by the Invention

However, it is a common sense that a gear clutch such as a dog clutch or a coupling sleeve is used, when one of the left and right auxiliary driving wheels is separated from the auxiliary driving wheel drive train at a time of the two-wheel drive as described above.

On the other hand, it is general that, in the previously proposed transfer for use in the part time four-wheel drive wheel, the two/four-wheel drive switching control is performed by performing a state switching between the transmitting state and the non-transmitting state according to engagement and release of the gear clutch such as the dog clutch and the coupling sleeve.

Therefore, it is necessary to switch each of the gear clutches placed at two locations from the release state to the engagement state, when performing the two-wheel→four-wheel drive switch from the two-wheel drive state to the four-wheel drive state, the two-wheel drive state being such that the transfer is in the non-transmitting state according to the releases of the gear clutches and one of the left and right auxiliary driving wheels is separated from the auxiliary driving wheel drive train according to the release of a corresponding one of the gear clutches. Hence, a problem such that a countermeasure against an engagement shock of the clutches and a countermeasure against an abnormal sound are difficult rises.

A basic prerequisite of a gist of the present invention is a traction-transmitting part time four-wheel drive vehicle in which a traction-transmitting transfer is equipped as the transfer.

It is an object of the present invention to propose two/four-wheel drive switching control apparatus and method for the traction-transmitting part time four-wheel drive vehicle which embody such an idea as described below and achieve a solution of the above-described problem on a basis of the following fact recognition that the engagement shock countermeasure and the abnormal noise countermeasure are comparatively easy if an order of an operation of a switching of the transfer from the non-transmitting state to the transmitting state and of an operation of the switching of the gear clutch from the released state to the engagement state at a time of the two-wheel→four-wheel drive switching is appropriately determined, even if the gear clutch to separate one of the left and right auxiliary driving wheels from the auxiliary driving wheel drive train is present, in order to realize a four-wheel drive in which the transfer is in the traction transmitting state according to an inter-roller radial direction pressing contact between rollers and to realize a two-wheel drive in which the transfer is in the non-transmitting state according to an inter-roller mutual radial direction separation between the rollers, in such a kind of four-wheel drive vehicles.

Means for Solving the Problem

To achieve the above-described object, the two/four-wheel drive switching control apparatus and control method for the traction-transmitting part time four-wheel drive vehicle are structured as follows. First, as the prerequisite, the traction-transmitting part time four-wheel drive vehicle will be described below. This vehicle can direct part of a torque toward the main driving wheels appropriately to left and right auxiliary driving wheels by means of the traction-transmitting transfer and is equipped with a gear clutch which separates at least one of the left and right auxiliary driving wheels from an auxiliary driving wheel drive train in the non-transmitting state of the transfer.

The two/four-wheel drive switching control apparatus, according to the present invention, for the traction-transmitting part time four-wheel drive vehicle comprises: two-wheel→four-wheel drive switching request detecting means; vehicle travel detecting means; traveling-time two-wheel→four-wheel drive switching means; vehicle stop detecting means; and stop-time two-wheel→four-wheel drive switching means.

The two-wheel→four-wheel drive switching request detecting means detects an occurrence of a two-wheel→four-wheel switching request from a two-wheel drive of the vehicle to a four-wheel drive thereof, the vehicle travel detecting means detects that the vehicle is being traveled, the traveling-time two-wheel→four-wheel drive switching means, responsive to signals from the vehicle travel detecting means and the two-wheel→four-wheel switching request detecting means, engages the gear clutch after the traction-transmitting transfer is directed into a transmitting state when, during the vehicle traveling, the two-wheel→four-wheel drive switching request has occurred, vehicle stop detecting means detects that the vehicle is being stopped and stop-time two-wheel→four-wheel drive switching means, responsive to signals from the vehicle stop detecting means and the two-wheel→four-wheel drive switching request detecting means, directs the traction-transmitting transfer into the transmitting state after the gear clutch is engaged when, during the vehicle stop, the two-wheel→four-wheel switching request has occurred.

The two/four-wheel drive switching control method, according to the present invention, for the traction-transmitting part time four-wheel drive vehicle according to the present invention comprises: a two-wheel→four-wheel drive switching request detecting step; a vehicle travel detecting step; a traveling-time two-wheel→four-wheel drive switching step; a vehicle stop detecting step; and a stop-time two-wheel→four-wheel drive switching step.

At the two-wheel→four-wheel drive switching request detecting step, an occurrence of a two-wheel→four-wheel switching request from a two-wheel drive of the vehicle to a four-wheel drive thereof is detected, at the vehicle travel detecting step, the traveling of the vehicle is detected, at the traveling-time two-wheel→four-wheel drive switching step, the gear clutch is engaged after the traction-transmitting transfer is directed into a transmitting state when, during the vehicle traveling, the two-wheel→four-wheel drive switching request has occurred, at the vehicle stop detecting step, the stop of the vehicle is detected, and, at the stop-time two wheel→four-wheel drive switching step, the traction-transmitting transfer is directed into the transmitting state after the gear clutch is engaged when, during the vehicle stop, the two-wheel→four-wheel switching request has occurred.

Effects of the Invention

In the two/four-wheel drive switching control apparatus and control method for the traction-transmitting part time four-wheel drive vehicle according to the present invention, in a case where the two-wheel→four-wheel drive switching request occurs during the traveling, the traction-transmitting transfer is directed to the transmitting state and, thereafter, the gear clutch is engaged to perform the two-wheel→four-wheel drive switching. The following action and effect can be exhibited.

In more details, if, when the two-wheel→four wheel drive switching is performed during the traveling, the engagement of the gear clutch is carried out prior to the state switching of the traction-transmitting transfer from the non-transmitting state to the transmitting state, the engagement of the gear clutch is carried out in a state in which a relative revolution of mutually engaging teeth of the gear clutch is not the relative revolution suitable for the shock countermeasure or the abnormal noise countermeasure. Consequently, such a problem that large shock and abnormal noise are generated at the time of the engagement of the gear clutch rises.

However, according to the present invention, since the engagement of the gear clutch is carried out after the traction-transmitting transfer is directed from the non-transmitting state to the transmitting state, due to a relative revolution variation of the gear clutch teeth developed when the traction-transmitting transfer is directed to the transmitting state, an instant at which the relative revolution of the gear clutch teeth becomes the relative revolution suitable for the shock countermeasure and the abnormal sound countermeasure is developed and the engagement of the gear clutch is carried out at the instant. Thus, the above-described problem such that the large shock and abnormal sound are generated during the engagement of the gear clutch can be prevented from occurring.

BRIEF DESCRIPTION OF THE DRAWINGS

FIG. 5 is a flowchart representing a program of two-wheel→four-wheel drive switching control executed by a transfer controller in FIG. 1.

DESCRIPTION OF THE EMBODIMENTS

Hereinafter, a preferred embodiment according to the present invention will be described in great details with reference to the drawings.

<Structure>

Figure 1:
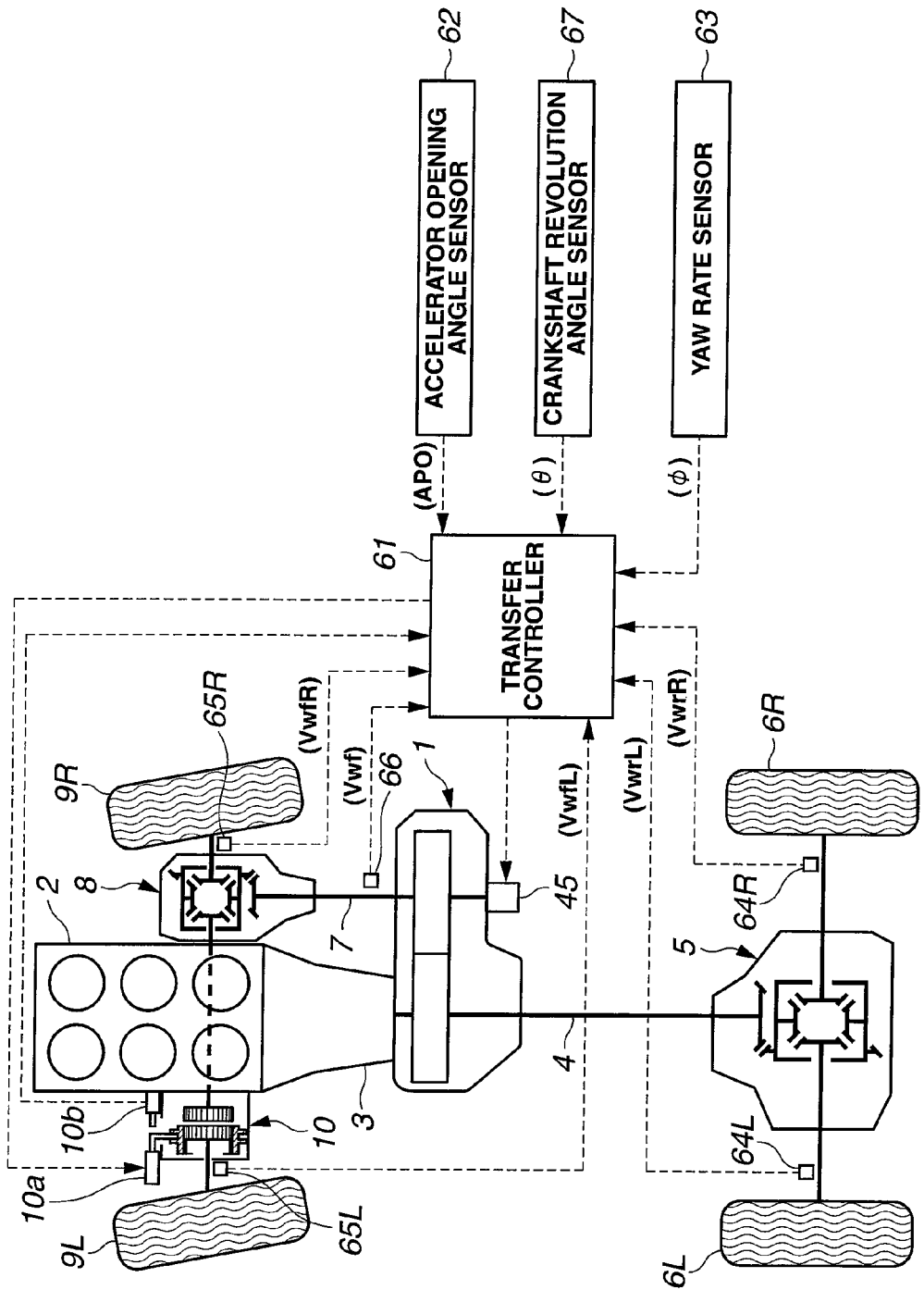
FIG. 1 is a rough plan view of a power train of a traction-transmitting part time four-wheel drive vehicle in which a traction-transmitting transfer including a two/four-wheel drive switching control apparatus in a preferred embodiment according to the present invention is equipped, as viewed from an upper part of the vehicle.

FIG. 1 is a rough plan view of a power train of a traction-transmitting part time four-wheel drive vehicle in which a traction-transmitting transfer including a two/four-wheel drive switching control apparatus in a preferred embodiment according to the present invention is equipped, as viewed from an upper part of the vehicle.

The four-wheel drive vehicle in FIG. 1 is a vehicle based on a rear wheel drive vehicle in which a revolution from an engine 2 is gear shifted by means of a transmission 3 and, thereafter, is transmitted to left and right rear road wheels 6L, 6R via a rear propeller shaft 4 and a rear final drive unit 5. Part of the torque toward left and right rear road wheels 6L, 6R (main driving wheels) is appropriately transmitted to left and right front wheels (auxiliary driving wheels) 9L, 9R via front propeller shaft 7 and a front final drive unit 8 by means of traction-transmitting transfer 1 to appropriately enable a four-wheel drive traveling.

It should be noted that a left front wheel drive shaft constituting a drive train of left front wheel (left auxiliary driving wheel) 9L in a drain train of left and right front road wheels (left and right auxiliary driving wheels) 9L, 9R is divided in a midway through the shaft and a gear clutch 10 such as a coupling sleeve, a dog clutch, and so forth is inserted in this drive shaft divided part. This gear clutch 10 is state switched between a released state shown in FIG. 1 and an engagement state which is moved in a rightward direction by means of an actuator 10a. At a time of the released state of gear clutch 10, left front road wheel (left auxiliary driving wheel) 9L is separated from the front road wheel drive train and, at a time of the engagement state thereof, left front wheel (left auxiliary driving wheel) 9L is coupled with the front wheel drive train.

Figure 2:
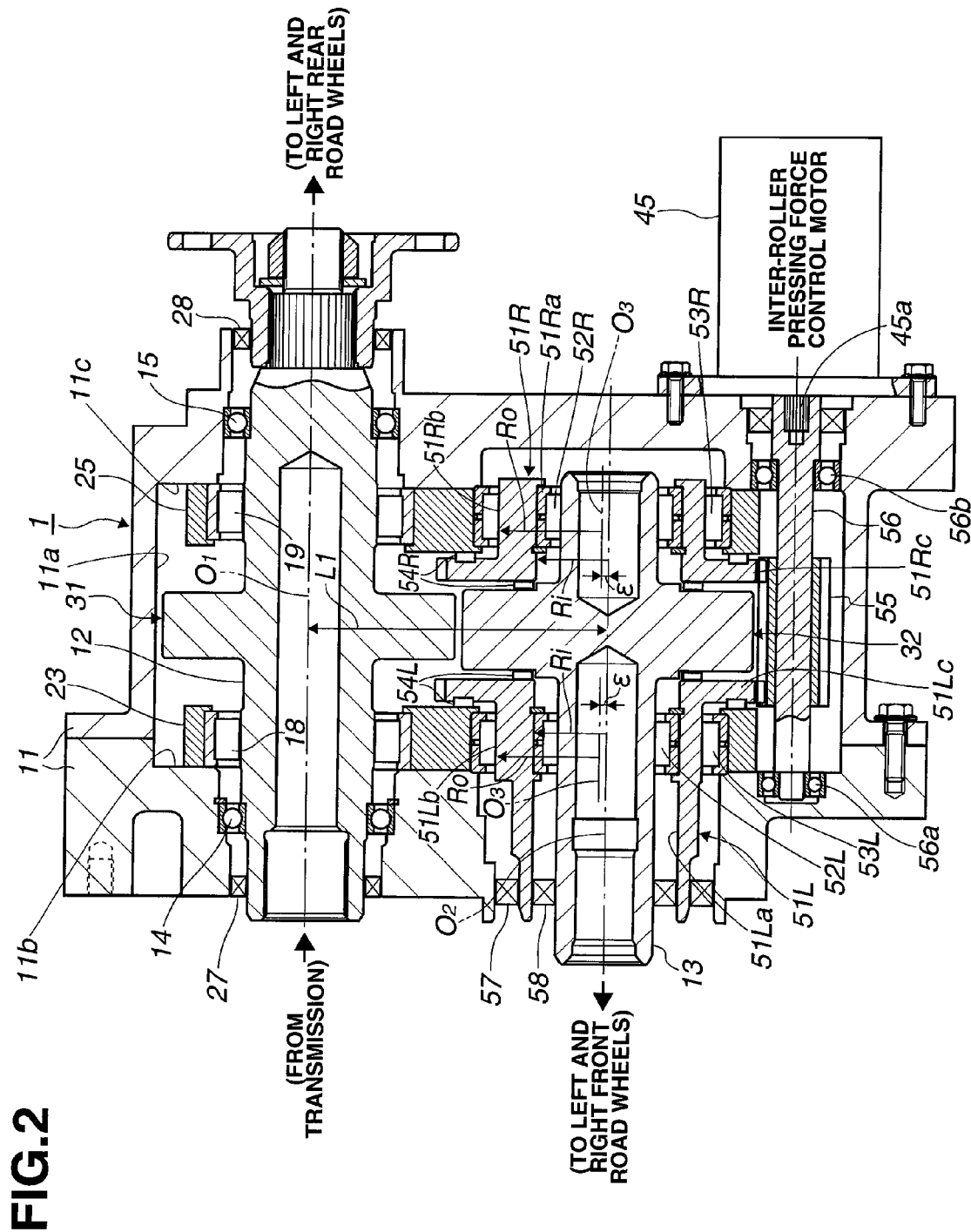
FIG. 2 is a longitudinally sectioned side view of a traction-transmitting transfer in FIG. 1.

Traction-transmitting transfer 1 distributes and outputs part of the torque toward left and right rear road wheels (main driving wheels) 6L, 6R as described above to left and right front road wheels (auxiliary driving wheels) 9L, 9R to determine a driving force distribution ratio between left and right rear road wheels (main driving wheels) 6L, 6R and left and right front road wheels (auxiliary driving wheels) 9L, 9R. In this embodiment, this traction-transmitting transfer 1 is constituted as shown in FIG. 2. In FIG. 2, 11 denotes a housing, an input axle 12 and an output axle 13 are disposed in parallel to each other and extended in a lateral direction within housing 11. Input axle 12 is rotatably supported around an axis line $0_1$ with respect to housing 11 by means of ball bearings 14, 15 placed at both ends of input axle 12.

Figure 3A:
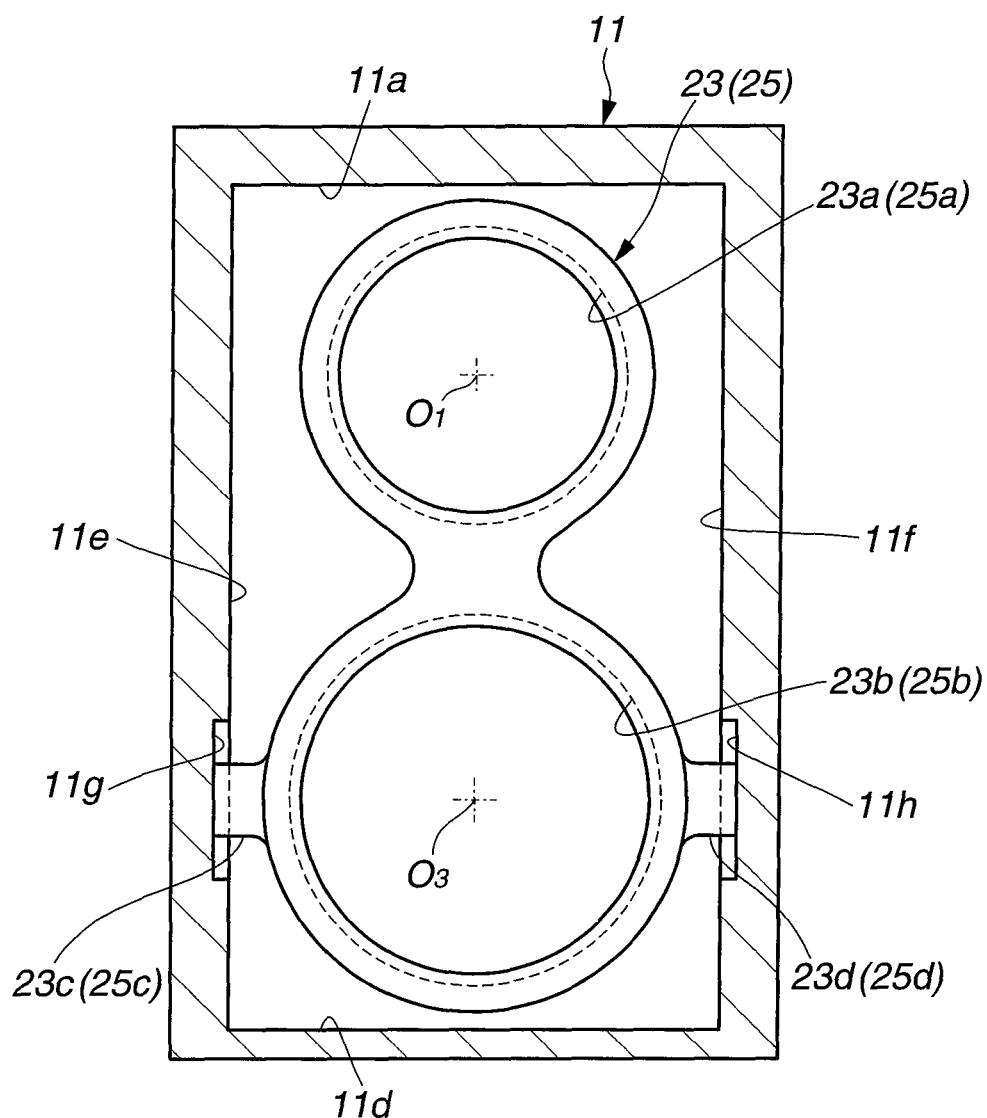
FIG. 3A is a front view of a bearing support used in the traction-transmitting transfer in FIG. 2.
Figure 3B:
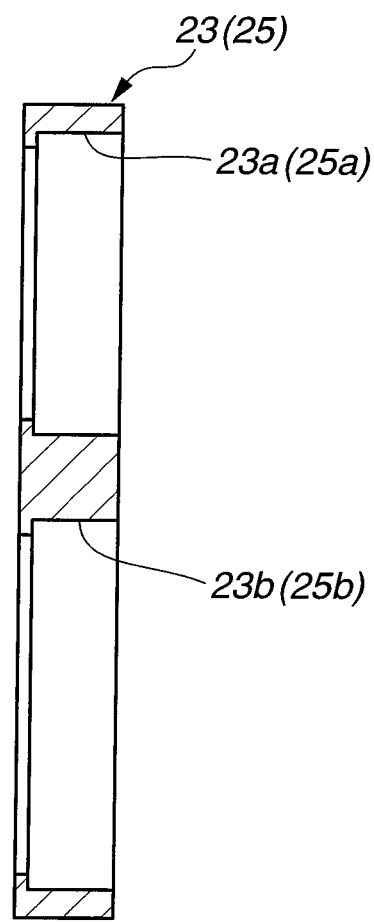
FIG. 3B is a longitudinally sectioned side view of the bearing support used in the traction-transmitting transfer in FIG. 2.

Input shaft 12 is furthermore rotatably supported with respect to bearing supports 23, 25 by means of roller bearings 18, 19. Openings 23a, 25a into which roll bearings 18, 19 are respectively fitted are disposed on bearing supports 23, 25 as shown in FIGS. 3A and 3B. These bearing supports 23, 25 are rotary supporting plates common to input and output axles 12, 13 and are disposed within housing 11 so as to bring into contact with corresponding inner side surfaces 11b, 11c of housing 11 as shown in FIG. 2 not fixed to these housing inner side surfaces 11b, 11c.

Both ends of input axle 12 are projected from housing 11 under a liquid tight sealing by means of seal rings 27, 28 as shown in FIG. 2. A left end of input axle 12 as viewed from FIG. 2 is coupled with an output shaft of transmission 3 (refer to FIG. 1) and a right end of input axle 12 is coupled with rear final drive unit 5 via rear propeller shaft 4 (refer to FIG. 1).

A first roller 31 is concentrically disposed at a middle position in an axis line direction of input axle 12 by means of an integral molding and a second roller 32 is concentrically disposed at a middle position in an axis line direction of output axle 13 by means of the integral molding. These first roller 31 and second roller 32 are disposed within a common axis right-angle plane.

Output axle 13 is rotatably supported indirectly with respect to housing 11 according to the structure as will be described below.

In details, hollow crankshafts 51L, 51R are disposed on both sides of second roller 32 in the axis direction of second roller 32 which is integrally molded at the middle position of output axle 13 and are fitted into both ends of output axle 13 with plays.

Bearings 52L, 52R are interposed between center holes 51La, 51Ra of these crankshafts 51L, 51R (whose radii are denoted by Ri) and play fitting portions to both ends of output axle 13 so as to enable a free rotation of output axle 13 around center axis line $0_2$ thereof within center holes 51L1, 51Ra of crankshafts 51L, 51R.

Figure 4:
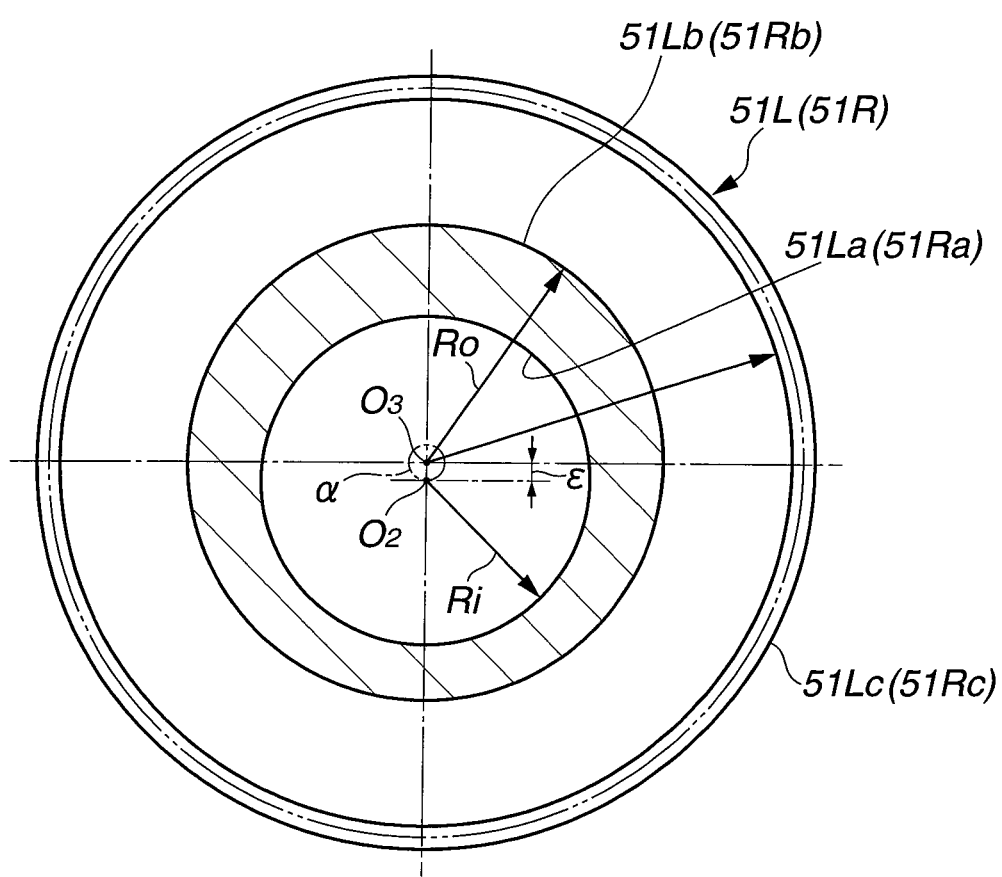
FIG. 4 is a longitudinally sectioned front view of crankshafts used in the traction-transmitting transfer in FIG. 2.

Outer peripheral portions 51Lb, 51Rb (whose radii are denoted by Ro in FIG. 4) which are eccentric to center holes 51La, 51Ra (center axis line $O_2$) are set as clearly shown in FIG. 4. A center axis line $O_3$ of these eccentric outer peripheral portions 51Lb, 51Rb is offset by an eccentric distance E between center axis lines $0_2$ and $0_3$ from axis line $O_2$ of center holes 51La, 51Ra (a rotary axis line of second rotor 32). Eccentric outer peripheral portions 51Lb, 51Rb of crankshafts 51L, 51R are rotatably supported within corresponding sides of bearing supports 23, 25 via bearings 53L, 53R as shown in FIG. 2. Therefore, openings 23b, 25b into which bearings 53L, 53R are fitted are disposed on bearing supports 23, 25, respectively, as shown in FIGS. 3A and 3B.

Bearing supports 23, 25 are the rotary supporting plates common to input and output axles 12, 13 as described above. Since these input and output axles 12, 13 are integrally provided with first roller 31 and second roller 32, respectively, bearing supports 23, 25 are also the to rotary supporting plates common to first roller 31 and second roller 32. As shown in FIGS. 2, 3A, and 3B, bearing supports 23, 25 have magnitudes not contacted with an inner wall 11a of housing 11 which is far way from output axle 13 with input axle 12 sandwiched and, as shown in FIGS. 3A and 3B, have magnitudes not contacted with an inner wall 11d of housing 11 which is far away from input axle 12 with output axle 13 sandwiched.

Then, bearing supports 23, 25 are, furthermore, provided with projections 23c, 25c and 23d, 25d to prevent input axle 12 (first roller 31) from a swing motion around axis line $O_1$ of input axle 12 (first roller 31) as shown in FIGS. 3A and 3B. These projections 23c, 25c and 23d, 25d are contacted with bottom surfaces of guide grooves 11g, 11h provided on corresponding inner side surfaces 11e, 11f of housing 11.

Guide grooves 11g, 11h are, as shown in FIG. 3A, elongated in a tangent direction of openings 23b, 25b provided on bearing supports 23, 25 so that displacements of projections 23c, 25c in the same tangent direction are not constrained.

Crankshafts 51L, 51R rotatably supported on bearing supports 23, 25 are under an axis line direction positioning between bearing supports 23, 25 by means of thrust bearings 54L, 54R together with second roller 32 as shown in FIG. 2, respectively.

As shown in FIG. 2, ring gears 51Lc, 51Rc which have the same specifications as eccentric outer peripheral portions 51Lb, 51Rb and are concentric to eccentric outer peripheral portions 51Lb, 51Rb are integrally provided on mutually faced adjacent ends of crankshafts 51L, 51R to mesh with a crankshaft drive pinion 55 common to these ring gears 51Lc, 51Rc.

It should be noted that crankshaft drive pinion 55 is meshed with ring gears 51Lc, 51Rc in a state in which eccentric outer peripheral portions 51Lb, 51Rb for both of crankshafts 51L, 51R are placed in mutually aligned rotary positions in circumferential directions of the crankshafts 51L, 51R.

Crankshaft drive pinion 55 is coupled with a pinion shaft 56 and both ends of pinion shaft 56 are rotatably supported on housing 11 by means of bearings 56a, 56b.

A right end of pinion shaft 56 placed at a right side in FIG. 2 is exposed to an outside of housing 11 with a liquid-tight sealing structure. An output shaft 45a of an inter-roller pressing force control motor 45 attached onto housing 11 is drivingly coupled with an exposed end surface of pinion shaft 56 by means of a serration fitting or so forth. When performing a rotary position control for each of crankshafts 51L, 51R via pinion 55 and ring gears 51Lc, 51Rc by means of inter-roller pressing force control motor 45, output axle 13 and rotary axis line $O_2$ of second roller 32 is turned along a locus circle a denoted by a broken line in FIG. 4. Hence, these inter-roller pressing force control motor 45, pinion 55, ring gears 51Lc, 51Rc, and crankshafts 51L, 51R constitute second roller turning means.

Second roller 32 approaches to first roller 31 through its radial direction according to the turning of rotary axis line $O_2$ (second roller 32) along locus circle α in FIG. 4. An inter-roller axis distance L1 (refer to FIG. 2) of these first roller 31 and second roller 32 can be set to be smaller than a sum value of the radius of first roller 31 and that of second roller 32 according to the revolution of crankshafts 51L, 51R in the corresponding directions of crankshafts 51L, 51R.

An inter-roller radial direction pressing force (an inter-roller transmission torque capacity) of second roller 32 against first roller 31 becomes large due to a shortening of inter-roller axis distance L1 and the inter-roller radial direction pressing force (the inter-roller transmission torque capacity) can arbitrarily be controlled in accordance with a degree of the shortening of the inter-roller axis distance L1.

It should be noted that, as shown in FIG. 2, in this embodiment, second roller rotary axis line $O_2$ is positioned directly under crankshaft rotary axis line $O_3$ and inter-roller axis line L1 between first roller 31 and second roller 32 at a bottom dead center at which inter-roller axis distance L1 becomes maximum is set to be larger than the sum value between the radius of first roller 31 and that of second roller 32.

Thus, since, at the bottom dead center, an outer peripheral surface of second roller 32 is separated from the outer peripheral surface of first roller 31, a state of a traction transmitting capacity=0 in which a traction transmission between these first and second rollers 31, 32 is not made can be obtained. Thus, the traction transmitting capacity can arbitrarily be controlled between 0 at the bottom dead center and the maximum value obtained at a top dead center (not shown) at which second roller rotary axis line $O_2$ is positioned directly above crankshaft rotary axis line $O_3$.

Crankshaft 51L and output axle 13 are projected from housing 11 at the left side as viewed from FIG. 2. A seal ring 57 is intervened between housing 11 and crankshaft 51L, at this projection portion. A seal ring 58 is intervened between crankshaft 51L and output axle 13. These seal rings 57, 58 provide the liquid tight sealing structures against a part of crankshaft 51L projected from housing 11 and the projection portion of output axle 13.

It should be noted that since centers of inner diameter and outer diameter portions at the end of crankshaft 51L at which seal rings 57, 58 are positioned are offset in the same way as the supporting positions of output axle 13 when seal rings 57, 58 are intervened respectively as described above, seal ring 57 is intervened between the outer diameter portion of the end of crankshaft 51L and housing 11, and seal ring 58 is intervened between the inner diameter portion of the end of crankshaft 51L and output axle 13.

According to the above-described seal structures, output axle 13 can favorably be continued to be sealed at the part thereof projected from housing 11 in spite of the fact that rotary axis line $O_2$ is turned and displaced due to the above-described turning of output axle 13 and second roller 32.

<Two-Wheel Drive State and Four-Wheel Drive State>

Two-wheel drive state and four-wheel drive state in the above-described embodiment shown in FIGS. 1 through 4. will, hereinafter, be described.

The torque which has reached to input axle 12 of traction-transmitting transfer 1 from transmission 3 (refer to FIG. 1) is, on the one hand, directly transmitted from input axle 12 to left and right rear road wheels 6L, 6R (main driving wheels) via rear propeller shaft 4 and rear final drive unit 5 (both should be referred to FIG. 1).

On the other hand, traction-transmitting transfer 1 in this embodiment performs the rotary position controls for crankshafts 51L, 51R via pinion 55 and ring gears 51Lc, 51Rc by means of inter-roller pressing force control motor 45. In a case where inter-roller axis line L1 is set to be smaller than the sum value between the radii of first roller 31 and second roller 32, each of first roller 31 and second roller 32 of traction-transmitting transfer 1 has the inter-roller transmission torque capacity which accords with a radial direction mutual pressing force. Thus, part of the torque toward left and right rear road wheels 6L, 6R (main driving wheels) can be directed to output axle 13 from first roller 31 via second roller 32.

It should be noted that a radial direction pressing reaction force between first roller 31 and second roller 32 during the transmission of transfer 1 described above is received by bearing supports 23, 25 which are common rotary supporting plates to these rollers. Hence, this pressing reaction force is not transmitted to housing 11. Thus, housing 11 is not needed to be formed with a high strength that can be resisted against the radial direction pressing reaction force between first roller 31 and second roller 32 and is not disadvantageous from the viewpoint of weight and cost.

Thereafter, the torque is directed to left and right front road wheels (auxiliary driving wheels) 9L, 9R from the left end of output axle 13 via front propeller shaft 7 (refer to FIG. 1) and via front final drive unit 8 (refer to FIG. 1).

If gear clutch 10 in FIG. 1 is forced in the engagement state by means of actuator 10a, the torque from output axle 13 via front propeller shaft 7 (refer to FIG. 1) and front final drive unit 8 (refer to FIG. 1) is transmitted to left and right front road wheels (auxiliary driving wheels) 9L, 9R to drive these auxiliary driving wheels.

Consequently, the vehicle can perform a four-wheel drive travel driving all of left and right rear road wheels 6L, 6R (main driving wheels) and left and right front road wheels 9L, 9R (auxiliary driving wheels).

During this four-wheel drive traveling, inter-roller pressing force control motor 45 causes crankshafts 51L, 51R to be revolved in a direction in which inter-roller axis distance L1 is decreased and the radial direction mutual pressing force between first roller 31 and second roller 32 is augmented. Thus, the traction transmission capacity between first and second rollers 31, 32 can be augmented. Inter-roller pressing force control motor 45 causes crankshafts 51L, 51R to be revolved in a reverse direction in which inter-roller axis distance L1 is increased and the radial direction mutual pressing force between first roller 31 and second roller 32 can be reduced. Thus, the traction transmission capacity between first and second rollers 31, 32 can be reduced.

Incidentally, in a case where inter-roller pressing force control motor 45 causes crankshafts 51L, 51R to be revolved at a position at which inter-roller axis distance L1 is larger than the sum value between the radii of first roller 31 and second roller 32, traction-transmitting transfer 1 has zero inter-roller transmission torque capacity without friction contact between outer peripheral surfaces of first and second rollers 31, 32. Hence, in this case, the torque to left and right rear road wheels 6L, 6R (main driving wheels) is not directed to output axle 13 from first roller 31 via second roller 32.

Therefore, the torque transmitted from output axle 13 to left and right front road wheels (auxiliary driving wheels) 9L, 9R via front propeller shaft 7 (refer to. FIG. 1) and front final drive unit 8 (refer to FIG. 1) is not present. Thus, the vehicle can perform the two-wheel drive traveling only by the drive of left and right rear road wheels (main driving wheels) 6L, 6R without drive of left and right front road wheels 9L, 9R (auxiliary driving wheels) 9L, 9R.

During the two-wheel drive traveling, the drive train of left and right front road wheels (auxiliary driving wheels) 9L, 9R which are not presently driven, namely, a power transmission system of transfer 1 and between left and right front road wheels (auxiliary driving wheels) 9L, 9R is in the reverse drive state in which the torque is transmitted from left and right front road wheels (auxiliary driving wheels) 9L, 9R to transfer 1 (accurately speaking, the auxiliary drive train is rotated from the tire side (auxiliary driving wheel side (namely, front road wheel side) as opposed to the positive driving state during the above-described four-wheel drive state (a state in which the torque is transmitted from transfer side 1 to left and right front road wheel side 9L, 9R). Thus, an influence of a rotating force from left and right front road wheels 9L, 9R is largely received.

The driving resistance generated by the reverse drive, in no small numbers, gives an influence on the vehicular vibration, the noise, the fuel consumption, and so forth. Thus, the countermeasure is needed.

That is to say, an ill influence such as a loss or so forth is given due to the revolution of the auxiliary drive train from the tire side. Thus, its countermeasure becomes necessary. In other words, an auxiliary driving wheel side drive shaft, an auxiliary driving wheel side differential, an auxiliary driving wheel side propeller shaft, and an auxiliary driving wheel side clutch element of the transfer (hereinafter, these are shortened to rotary bodies for simplicity) are mechanically coupled with the auxiliary driving wheels. These rotary bodies are revolved together with one another along with the revolution of auxiliary driving wheels during the two-wheel drive. In addition, during the two-wheel drive, these rotary bodies are revolved in spite of the fact that these the rotary bodies are not needed to be revolved. The revolutions of these rotary bodies cause friction resistances in bearings or gears and the rotary inertia to give driving losses.

In this embodiment, for this countermeasure, gear clutch 10 during the above-described two-wheel drive traveling is forced in the released state by means of actuator 10a so that left front road wheel (left auxiliary driving wheel) 9L is separated from a front wheel drive train to enable a free rotation of the separated left front road wheel (left auxiliary driving wheel) 9L. Thus, the driving resistance along with the reverse drive at the time of the two-wheel drive traveling is decreased as low as possible and the ill influence on the vehicular vibration, noise, the fuel consumption, and so forth is eliminated.

<Two-Wheel→Four-Wheel Drive Switching Control>

As appreciated from the above description, when a two-wheel→four-wheel drive switching control from the two-wheel drive traveling to the four-wheel drive traveling is performed, it is necessary to couple left front road wheel (left auxiliary driving wheel) 9L with the front wheel drive train, with gear clutch 10 transferred from the released state to the engagement state by means of actuator 10a, in addition to a non-transmitting state of transfer 1 due to the mutual radial direction separation of first and second rollers 31, 32.

In this embodiment, in order to achieve the two-wheel drive→four-wheel drive switching control according to the two operations described above and in order to achieve the traction transmitting capacity control for transfer 1 (between first roller 31 and second roller 32) during the four-wheel drive traveling, a transfer controller 61 is provided as shown in FIG. 1 to perform the above-described two-wheel→four-wheel drive switching control and the traction transmitting capacity control.

Therefore, transfer controller 61 inputs a signal from a gear clutch engagement sensor 10b disposed as shown in FIG. 1 which is turned to ON when actuator 10a causes gear clutch 10 to be in the engagement state, a signal from an accelerator opening angle sensor 62 detecting a depression quantity (an accelerator opening angle) APO of an accelerator pedal which increases and decreases an output of engine 2, a signal from a yaw rate sensor 63 detecting a yaw rate Φ around a vertical axis line passing a weight center of the vehicle, a signal from a left rear road wheel revolution speed sensor 64L detecting a revolution speed (revolution number per time) VwrL of left rear road wheel 6L (left main driving wheel), a signal from a right rear road wheel revolution speed sensor 64R detecting a revolution speed (revolution number per time) VwrR of right rear road wheel 6R (right main driving wheel), a signal from a left front road wheel revolution speed sensor 65L detecting a revolution speed (revolution number per time) VwfL of left front road wheel 9L (left auxiliary driving wheel), a signal from a right front road wheel revolution speed sensor 65R detecting a revolution speed (revolution number per time) VwfR of right front road wheel 9R (left auxiliary driving wheel), a signal from a front road wheel revolution speed sensor 66 detecting a revolution speed (front wheel revolution number per time) Vwf of front propeller shaft 7, and a signal from a crankshaft revolution angle sensor 67 detecting an revolution angle θ of crankshafts 51L, 51R.

Transfer controller 61 executes a control program shown in FIG. 5 to perform the two-wheel→four-wheel drive switching control according to a switching from the released state of gear clutch 10 to the engagement state thereof via actuator 10a and according to a switching from the non-transmitting state of transfer 1 to the transmitting state thereof via inter-roller pressing force control motor 45 and performs the traction transmitting capacity control of transfer 1 during the four-wheel drive traveling after the switching of the two-wheel drive to the four-wheel drive in accordance with a control program (not shown) as will briefly be described later.

First, the two-wheel→four-wheel drive switching control shown in FIG. 5 will be described. At a step S11, transfer controller 61 determines whether a request to switch two-wheel→four-wheel drive by a vehicle driver or according to an automatic control is present. Hence, step S11 corresponds to two-wheel→four-wheel drive switching request detecting means according to the present invention.

While a determination that the request to switch the two-wheel→four-wheel drive is not present is made, the control is directly ended. If, at step S11, the determination that the request to switch two-wheel drive to four-wheel drive is present is made, this control is advanced to a step S12 to execute the two-wheel→four-wheel drive switching control which is an aim of the present invention as will be described below.

At step S12, transfer controller 61 checks to see whether the vehicle is being stopped or not (being traveled) to determine whether the above-described two-wheel→four-wheel drive switching request is made in the stopped state or in the traveled state. Hence, step S12 corresponds to vehicle stop detecting means and vehicle travel detecting means according to the present invention.

In a case where, at steps S11 and S12, transfer controller 61 determines that the request to switch two-wheel→four-wheel drive during the vehicle stop is present, at a step S13, transfer controller 61 issues a command to engage gear clutch 10 and actuates actuator 10a to achieve this command. At a step S14, transfer controller 61 checks to see if the engagement of gear clutch 10 is ended according to the actuation of actuator 10a on a basis of the signal from gear clutch engagement sensor 10b.

If the engagement of gear clutch 10 is not yet ended at step S14, this control is returned to step S13 to actuate actuator 10a continuously in the same direction to further progress the engagement of gear clutch 10.

If, at step S14, transfer controller 61 determines that the engagement of gear clutch 10 is completed, the control is advanced to a step S15 so that the actuation of actuator 10a that has been carried out at step S13 is not carried out any more.

At step S15, transfer controller 61 issues the command to switch transfer 1 from the non-transmitting state to the transmitting state. This command is supplied to inter-roller pressing force control motor 45. At this time, inter-roller pressing force control motor 45 is revolved for crankshafts 51L, 51R to have the traction transmitting capacity with second roller 32 contacted with first roller 31.

Transfer 1 is directed from the non-transmitting state in which first and second rollers 31 32 are mutually spaced apart in the radial direction to the transmitting state in which first and second rollers 31, 32 are mutually pressed against each other and contacted with each other in the radial direction according to the revolution of crankshafts 51L, 51R via inter-roller pressing force control motor 45.

At a step S16, transfer controller 61 determines whether the switching from the non-transmitting state of transfer 1 to the transmitting state thereof is ended on a basis of crankshaft revolution angle θ. If before the end of the state transfer, this control is returned to step S15. Inter-roller pressing force control motor 45 causes crankshafts 51L, 51R to be continuously revolved in the same direction in order to further advance the state switching of transfer 1.

If, at step S16, the switching from the non-transmitting state of transfer 1 to the transmitting state thereof is determined to be ended, this control is ended to drop out a loop of FIG. 5. Thus, the revolution of crankshafts 51L, 51R according to the inter-roller pressing force control motor 45 that has been carried out at step S15 is not carried out any more.

As appreciated from the above description, in a case where the two-wheel→four-wheel drive switching request during the vehicle stop is determined to be present, traction-transmitting transfer 1 is switched from the non-transmitting state to the transmitting state (steps S15 and S16) after gear clutch 10 has been engaged (steps S13 and S14).

Hence, steps S13 through S16 correspond to stop-time two-wheel→four-wheel drive switching means according to the present invention.

In a case where the two-wheel→four-wheel drive switching request is determined to be present during the vehicle traveling at steps S11 and S12, this control is advanced to a step S17. At step S17, transfer controller 61 calculates revolution speed difference Δ Vw between the auxiliary driving wheel final drives according to an equation (1) as will be described below using revolution speed Vwf of front propeller shaft 7, revolution speed VwfL (revolution numbers per time) of left front road wheel 9L (left auxiliary driving wheel), revolution speed (revolution numbers per time) VwfR of right front road wheel (right driving wheel) 9R, and a final drive gear ratio if. Then, transfer controller 61 checks to see if the derived auxiliary driving wheel final drive revolution speed difference Δ Vw is smaller than a set value α except 0.

$$Vw = |(VwfL+VwfR) \equiv Vwf/if| \qquad (1)$$

In equation (1), VwfL: left front side road wheel speed (rpm), VwfR: right front side road wheel speed, if: final drive gear ratio, and Vwf: front propeller shaft revolution speed (rpm). In equation (1), a revolution balance on front final drive 8 can be expressed in the following equation (2).

$$(Vidl+VwfR)/2 = Vwf/if \qquad (2)$$

In equation (2), Vidl denotes an intermediate shaft revolution between gear clutch 10 and front propeller shaft 7.

If the above-described equation (2) is rearranged, the following equation (3) is given.

$$Vidl = 2Vwf/if \equiv VwfR \qquad (3)$$

In addition, the revolution speed difference which gives an influence on a shock and a responsive characteristic and which is important for the present invention is the difference revolution at gear clutch 10 (road wheel side and the final drive side). This difference revolution is assumed to Δ V10 which is calculated as in the following equation (4).

$$\Delta V10 = VwfL \equiv Vidl \qquad (4)$$

If the above-described equation (3) is substituted into equation (4), the following equation (5) is given $$\Delta V10 = VwfL \equiv (2Vwf/if \equiv VwfR) \qquad (5)$$
$$= (VwfL + VwfR) \equiv 2Vwf/if$$

If only the revolution speed difference is handled, equation (5) can be considered as an absolute value. Hence, an absolute value notation is used as expressed in equation (1). It should be noted that set value α related to the revolution speed difference Δ Vw between main and auxiliary driving wheels is assumed to be a lower limit value of the revolution speed difference between the main and auxiliary driving wheels which provide problems of the engagement shock and abnormal sound when gear clutch 10 is transferred from the released state to the engagement state. It should, further, be noted that transfer controller 61, at step S17, may check to see if the revolution speed difference (revolution number difference) (Vwf−(VwrL+VwrR)/2) between the main driving wheels and the auxiliary driving wheels which is derived by subtracting an average value (the revolution numbers per time of the rear road wheels which are the main driving wheels) {(VwrL+VwrR)/2} of revolution speed (revolution numbers per time) VwrL of left rear road wheel 6L (left main driving wheel) and the revolution speed (revolution numbers per time) VwrR of right rear road wheel 6R (right main driving wheel) from revolution speed Vwf of front propeller shaft 7 is smaller than set value α except 0. In this alternative case, set value α related to the revolution speed difference between the main and auxiliary driving wheels Δ Vw is assumed to the lower limit value of the revolution speed difference between the main and auxiliary driving wheels which provides the engagement shock and abnormal sound when gear clutch 10 is transferred from the released state to the engagement state.

If transfer controller 61 determines, at step S17, that revolution speed difference between the auxiliary driving wheel final drives (or revolution speed difference between main and auxiliary driving wheels) Δ Vw is determined not to be smaller than set value α except 0, namely, in a case where the large shock and abnormal sound are generated when gear clutch 10 is switched from the released state to the engagement state, this control is advanced to a step S18.

The two-wheel→four-wheel drive switching request is achieved as follows in a loop including this step S18.

At step S18, transfer controller 61 issues and supplies the command to switch transfer 1 from the non-transmitting state to the transmitting state to inter-roller pressing force control motor 45. At this time, inter-roller pressing force control motor 45 revolves crankshafts 51L, 51R to have the traction transmitting capacity, with second roller 32 contacted with first roller 31.

The revolution of crankshafts 51L, 51R via inter-roller pressing force control motor 45 causes transfer 1 to be switched from the non-transmitting state in which first and second rollers 31, 32 are mutually spaced apart from each other in the radial direction to the transmitting state in which first and second rollers 31, 32 are mutually pressed and contacted with each other in the radial direction.

Along with an advance of the state switching of transfer 1, revolution speed difference Δ Vw between the auxiliary drive wheel final drives described above at step S17 is varied.

At a step S19, due to this variation, transfer controller 61 checks to see if revolution speed difference Δ Vw between the auxiliary driving wheel final drives is smaller than set value α except 0.

If revolution speed difference Δ Vw between auxiliary driving wheel final drives is determined to fall in 0<ΔVw<α, namely, in a case where, even if gear clutch 10 is switched from the released state to the engagement state, neither large shock nor abnormal sound is generated, this control is advanced to a step S21. Transfer controller 61 issues a command to engage gear clutch 10 to actuate actuator 10a to achieve this command and this control is advanced to a step S22.

However, if revolution speed difference Δ Vw between the auxiliary driving wheel final drives is not determined to fall in 0<ΔVw<α, namely, in a case where, when gear clutch 10 is switched from the released state to the engagement state, the large shock and abnormal sound are generated, step S21 described above is skipped, the command to engage gear clutch 10 is not issued, and this control is advanced to a step S22.

At step S22, transfer controller 61 determines whether the switching of transfer 1 during the execution in response to the command at step S18 from the non-transmitting state to the transmitting state has been ended on a basis of the crankshaft revolution angle θ. If it is before the end of the switching, this control is returned to step S18 so as to continuously revolve crankshafts 51L, 51R in the same direction through inter-roller pressing force control motor 45 to further advance the state switching of transfer 1.

If, at step S22, transfer controller 61 determines that the switching from the non-transmitting state of transfer 1 to the transmitting state thereof has been completed, this control is advanced to a step S23. Then, the revolution of crankshafts 51L, 51R by means of inter-roller pressing force control motor 45 carried out at step S18 are not carried out any more.

At step S23, transfer controller 61 determines whether the engagement of gear clutch 10 by means of actuator 10a has been completed on a basis of the signal from gear clutch engagement sensor 10b.

If the engagement of gear clutch 10 is not yet completed, this control is returned to step S21 at which actuator 10a is continuously actuated in the same direction to further advance the engagement of gear clutch 10.

If transfer controller 61 determines, at step S23, that the engagement of gear clutch 10 is completed, this control is ended to drop out the loop in FIG. 5. The actuation of actuator 10a carried out at step S21 is not continued any more.

As appreciated from the above description, in a case where the two-wheel→four-wheel drive switching request is present during the traveling, an operation of switching of traction-transmitting transfer 1 from the non-transmitting state to the transmitting state is preceded (step S18 and step S22). When, along with the advance of state switching of traction-transmitting transfer 1, revolution speed difference Δ Vw between the auxiliary driving wheel final drives is 0<ΔVw<α so that the large shock and abnormal sound are not generated even if gear clutch 10 is switched from the released state to the engagement state (step S19), gear clutch 10 is engaged (steps S21 and S23).

Hence, steps S18 through S23 correspond to traveling-time two-wheel→four-wheel drive switching means (section) according to the present invention.

When, at step S11 and step S12, transfer controller 61 determines that the request to switch the two-wheel→four-wheel drive during the vehicle traveling is present and, at step S17, revolution speed difference Δ Vw between the auxiliary driving wheel final drives is already smaller than set value α except 0 during the presence of the two-wheel→four-wheel drive request so that transfer controller 61 determines that the large shock and abnormal sound are not generated even if gear clutch 10 is engaged, this control is advanced to a step S24. The two-wheel→four-wheel drive switching request is achieved in the following way in a loop including this step S24.

That is to say, at step S24, transfer controller 61 issues and supplies the command to switch transfer 1 from the non-transmitting state to the transmitting state to inter-roller pressing force control motor 45. At this time, at the same time when transfer 1 is switched from the non-transmitting state to the transmitting state, at step S25, transfer controller 61 issues the command to engage gear clutch 10 to actuate actuator 10a to achieve this command. Thus, gear clutch 10 is switched from the released state to the engagement state.

At a step S26, transfer controller 61 determines whether the switching of transfer 1 from the non-transmitting state to the transmitting state under the execution has been completed on a basis of crankshaft revolution angle θ.

If not yet completed (before the end), this control is returned to step S24.

Inter-roller pressing force control motor 45, at this step, continuously revolves crankshafts 51L, 51R in the same direction in order to further advance the state switching of transfer 1.

If, at step S26, transfer controller 61 determines that the switching of transfer 1 from the non-transmitting state to the transmitting state has been completed, this control is advanced to a step S27 so that the revolution of crankshafts 51L, 51R through inter-roller pressing force control motor 45 carried out at step S24 are not carried out any more.

At step S27, transfer controller 61 determines whether the engagement of gear clutch 10 by means of actuator 10a has been completed on a basis of the signal from gear clutch engagement sensor 10b.

If the engagement of gear clutch 10 is not yet completed, this control is returned to step S25 at which actuator 10a is continuously actuated in the same direction to further advance the engagement of gear clutch 10.

When transfer controller 61 determines, at step to S27, that the engagement of gear clutch 10 has been completed, this control is ended to drop out the loop in FIG. 5 so that the actuation of actuator 10a carried out at step S25 is not carried out any more.

As appreciated from the above description, in a case where revolution speed difference Δ Vw between the auxiliary driving wheel final drives is already smaller than set value α except 0 when the request to switch the two-wheel→four-wheel drive during the vehicle traveling is present so that the large shock and abnormal sound are not generated, the command to switch transfer 1 from the non-transmitting state to the transmitting state (step S24) and the command to engage gear clutch 10 (step S25) are simultaneously issued and these commands are simultaneously executed (step S16 and step S27). Hence, step S24 through step S27 also correspond to traveling-time two-wheel→four-wheel drive switching means.

The traction transmitting capacity control of transfer 1 after the end of two-wheel→four-wheel drive switching control according to the control as described hereinabove with reference to FIG. 5 will briefly be explained below.

On a basis of accelerator opening angle APO detected by sensor 62 shown in FIG. 1, a rear road wheel revolution speed which is an average value of left and right rear road wheel revolution numbers per time VwrL, VwrR detected by sensors 64L, 64R, and yaw rate Φ detected by sensor 63, by a well-known technique, transfer controller 61 derives a front-rear road wheel target driving force distribution ratio and present left and right rear road wheel driving forces and, thereafter, calculates a target front wheel driving force Tf to be distributed to left and right front road wheels (auxiliary driving wheels) 9L, 9R from the front-rear road wheel target driving force distribution ratio and present left and right rear road wheel driving forces.

Next, transfer controller 61 derives an inter-roller radial direction pressing force Fr corresponding to an inter-roller transmission torque capacity required to transmit this target front road wheel driving force Tf through first roller 31 and second roller 32 using a map search technique and performs the rotary position control for crankshafts 51L, 51R through inter-roller pressing force control motor 45 to achieve the inter-roller radial direction pressing force Fr. Transfer 1 directs the torque corresponding to target front road wheel driving force Tf to left and right front road wheels (auxiliary driving wheels) 9L, 9R according to the rotary position control for crankshafts 51L, 51R so that the above-described front-rear road wheel target driving force distribution ratio can be achieved.

<Action and Effect>

According to the two-wheel→four-wheel drive switching control apparatus in the embodiment as described above, in a case where the two-wheel→four-wheel drive switching request is present during the traveling of the vehicle (step S11 and step S12), the operation of switching traction-transmitting transfer 1 from the non-transmitting state to the transmitting state is preceded (step S18 and step S22). When, along with the advance of state switching of traction-transmitting transfer 1, revolution speed difference Δ Vw between the auxiliary driving wheel final drives (or between the main and auxiliary driving wheels) is 0<ΔVw<α so that the large shock and abnormal sound are not generated even if gear clutch 10 is switched from the released state to the engagement state (step S19), gear clutch 10 is engaged (step S21 and step S23). Hence, the engagement of gear clutch 10 is carried out when relative revolutions of engagement teeth of gear clutch 10 indicate relative revolutions suitable for the shock countermeasure and abnormal sound countermeasure due to a relative revolution variation of the engagement teeth of gear clutch 10 developed when traction-transmitting transfer 1 is directed to the transmitting state. Consequently, the problems such that the large shock and abnormal noise are generated at the time of the engagement of gear clutch 10 can be solved.

It should be noted that, if the engagement operation of gear clutch 10 is performed in a case where revolution speed difference Δ Vw between the auxiliary driving wheel final drives is 0, the relative revolutions of the engagement teeth of gear clutch 10 are 0. Hence, in this case, in a state in which the teeth of gear clutch 10 are mutually position shifted, the clutch engagement cannot be carried out for any length of time.

However, in the case of the embodiment, the engagement operation of gear clutch 10 is carried out when revolution speed difference Δ Vw between the auxiliary driving wheel final drives is 0<Δ Vw<α, namely, when revolution speed difference Δ Vw between the auxiliary driving wheel final drives is smaller than set value α except 0, the engagement operation of gear clutch 10 is carried out. Hence, the engagement operation is carried out when a slight relative revolution between gear clutch teeth is present.

Therefore, even if the engagement operation of gear clutch 10 is performed in a state in which the gear clutch teeth are mutually position shifted, this clutch engagement can positively be completed so that the above-described problems such that the engagement of the clutch cannot be carried out for any length of time can be avoided.

In addition, in a case where revolution speed difference Δ Vw between the auxiliary driving wheel final drives (or between the main and auxiliary driving wheels) is already smaller than α except 0 when the two-wheel→four-wheel drive switching request is present during the traveling (step S11 and step S12) and the large shock and abnormal noise are not generated even if gear clutch 10 is engaged (step S17), the command to switch traction-transmitting transfer 1 from the non-transmitting state to the transmitting state (step S24) and the command to engage gear clutch 10 (step S25) are simultaneously issued and simultaneously executed (step S26 and step S27). Hence, such a state in which the engagement of gear clutch 10 is wastefully delayed can be avoided and a two-wheel→four-wheel drive switching response during the vehicle traveling can be increased.

Furthermore, in this embodiment, in a case where the two-wheel→four-wheel drive switching request is present during the vehicle stop (step S11 and step S12), the above-described problem of generations of shock and abnormal sound does not occur due to the stop of the vehicle. Hence, gear clutch 10 is first engaged (step S13 and step S14) and, thereafter, traction-transmitting transfer 1 is switched from the non-transmitting state to the transmitting state (step S15 and step S16). Therefore, even if the engagement operation of gear clutch 10 is carried out in a state in which the engagement clutch teeth are mutually position shifted, the engagement of clutch 10 can immediately be completed according to the relative revolutions of gear clutch teeth along with the switching of traction-transmitting transfer 1 from the non-transmitting state to the transmitting state. Thus, a response characteristic can be increased.

| Explanation of signs | |
|---|---|
| 1 | traction-transmitting transfer |
| 2 | engine |
| 3 | transmission |
| 4 | rear propeller shaft |
| 5 | rear final drive unit |
| 6L, 6R | left and right rear road wheels (main driving wheels) |
| 7 | front propeller shaft |
| 8 | front final drive unit |
| 9L, 9R | left and right front road wheels (auxiliary driving wheels) |
| 11 | housing |
| 12 | input axle |
| 13 | output axle |
| 18, 19 | roller bearing |
| 23, 25 | bearing support |
| 31 | first roller |
| 32 | second roller |
| 45 | inter-roller pressing force control motor |
| 51L, 51R | crankshaft |
| 51Lc, 51Rc | ring gear |
| 52L, 52R, 53L, 53R | bearing |
| 54L, 54R | thrust bearing |
| 55 | crankshaft driving pinion |
| 56 | pinion shaft |
| 57, 58 | seal ring |
| 61 | transfer controller |
| 62 | accelerator opening angle sensor |
| 63 | yaw rate sensor |
| 64L, 64R | left and right rear road wheel revolution speed sensors |
| 65L, 65R | left and right front road wheel revolution speed sensors |
| 66 | front propeller shaft revolution speed sensor |
| 67 | crankshaft revolution angle sensor |

The invention claimed is:

1. A two/four-wheel drive switching control apparatus for a traction-transmitting part time four-wheel drive vehicle, the traction-transmitting part time four-wheel drive vehicle including:
a traction-transmitting transfer which is capable of directing appropriately part of a torque toward main driving wheels to left and right auxiliary driving wheels; and
a gear clutch configured to separate at least one of the left and right auxiliary driving wheels from an auxiliary driving wheel drive train in a non-transmitting state of the transfer, and
the two/four-wheel drive switching control apparatus comprising:
two-wheel→four-wheel drive switching request detecting means for detecting an occurrence of a two-wheel→four-wheel switching request from a two-wheel drive of the vehicle to a four-wheel drive thereof;
vehicle travel detecting means for detecting that the vehicle is being traveled;
traveling-time two-wheel→four-wheel drive switching means, responsive to signals from the vehicle travel detecting means and the two-wheel→four-wheel drive switching request detecting means, for engaging the gear clutch after the traction-transmitting transfer is directed into a transmitting state when, during the vehicle traveling, the two-wheel→four-wheel drive switching request has occurred;
vehicle stop detecting means for detecting that the vehicle is being stopped; and
stop-time two-wheel→four-wheel drive switching means, responsive to signals from the vehicle stop detecting means and the two-wheel→four-wheel drive switching request detecting means, for directing the traction-transmitting transfer into the transmitting state after the gear clutch is engaged when, during the vehicle stop, the two-wheel→four-wheel switching request has occurred.

2. The two/four-wheel drive switching control apparatus for the traction-transmitting part time four-wheel drive vehicle as claimed in claim 1, wherein the traveling-time two-wheel→four-wheel drive switching means directs the engagement of the gear clutch when a revolution speed difference between auxiliary driving wheel final drives is smaller than a set value except 0.

3. The two/four-wheel drive switching control apparatus for the traction-transmitting part time four-wheel drive vehicle as claimed in claim 1, wherein the traveling-time two-wheel→four-wheel drive switching means directs the engagement of the gear clutch when a revolution speed difference between the main and auxiliary driving wheels is smaller than a set value except 0.

4. The two/four-wheel drive switching control apparatus for the traction-transmitting part time four-wheel drive vehicle as claimed in claim 1, wherein the traveling-time two-wheel→four-wheel drive switching means simultaneously issues a command to direct the traction-transmitting transfer into the transmitting state and another command to engage the gear clutch and simultaneously executes these commands if a revolution speed difference between the main and auxiliary driving wheels is already smaller than a set value except 0 when, during the vehicle traveling, the two-wheel→four-wheel drive switching request has occurred.

5. A two/four-wheel drive switching control method for a traction-transmitting part time four-wheel drive vehicle, the traction-transmitting part time four-wheel drive vehicle including:
a traction-transmitting transfer which is capable of directing appropriately part of a torque toward main driving wheels to left and right auxiliary driving wheels; and
a gear clutch configured to separate at least one of the left and right auxiliary driving wheels from an auxiliary driving wheel drive train in a non-transmitting state of the transfer, and
the two/four-wheel drive switching control method comprising:
detecting an occurrence of a two-wheel→four-wheel switching request from a two-wheel drive to a four-wheel drive;
detecting that the vehicle is being traveled;
when, during the vehicle traveling, the two-wheel→four-wheel drive switching request has occurred, engaging the gear clutch after the traction-transmitting transfer is directed into a transmitting state;
detecting that the vehicle is stopped; and
when, during the vehicle stop, the two-wheel→four-wheel switching request has occurred, directing the traction-transmitting transfer into the transmitting state after the gear clutch is engaged.

6. The two/four-wheel drive switching control method for the traction-transmitting part time four-wheel drive vehicle as claimed in claim 5, wherein, at the traveling time two-wheel→four-wheel drive switching step, directing the engagement of the gear clutch when a revolution speed difference between the main and auxiliary driving wheels is smaller than a set value except 0.

7. The two/four-wheel drive switching control method for the traction-transmitting part time four-wheel drive vehicle as claimed in claim 5, wherein, at the traveling-time two-wheel→four-wheel drive switching step, directing the engagement of the gear clutch when a revolution speed difference between auxiliary driving wheel final drives is smaller than a set value except 0.

8. The two/four-wheel drive switching control method for the traction-transmitting part time four-wheel drive vehicle as claimed in claim 5, wherein, at the traveling time two-wheel→four-wheel drive switching step, simultaneously issuing a command to direct the traction-transmitting transfer to the transmitting state and another command to engage the gear clutch and simultaneously executing these commands if a revolution speed difference between the main and auxiliary driving wheels is already smaller than a set value except 0 when, during the vehicle traveling, the two-wheel→four-wheel drive switching request during the travel of the vehicle has occurred.

\* \* \* \* \*